Feb. 23, 1932.  R. THOMSON  1,846,408
THREAD CUTTING TOOL
Filed May 20, 1929.  2 Sheets-Sheet 1
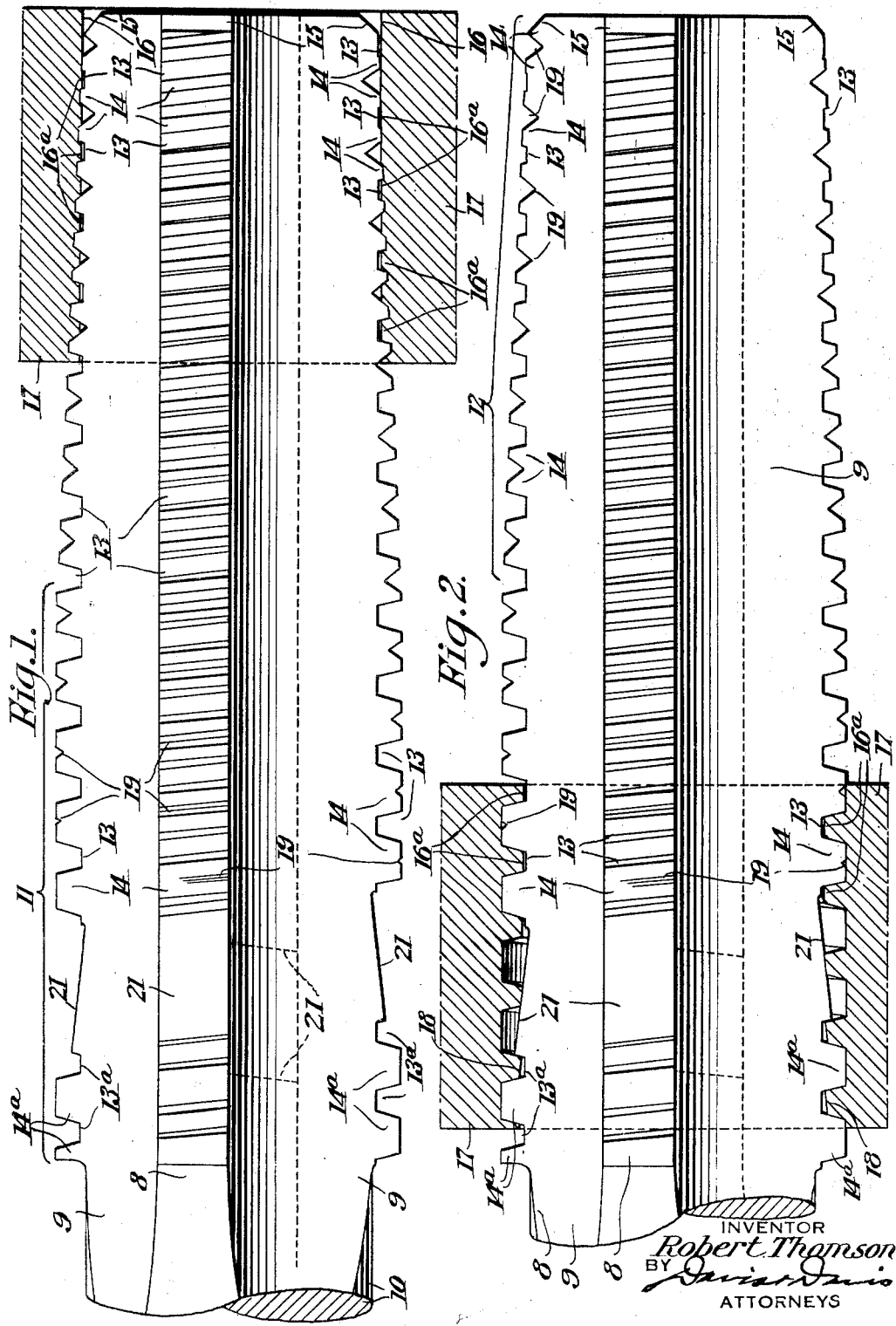

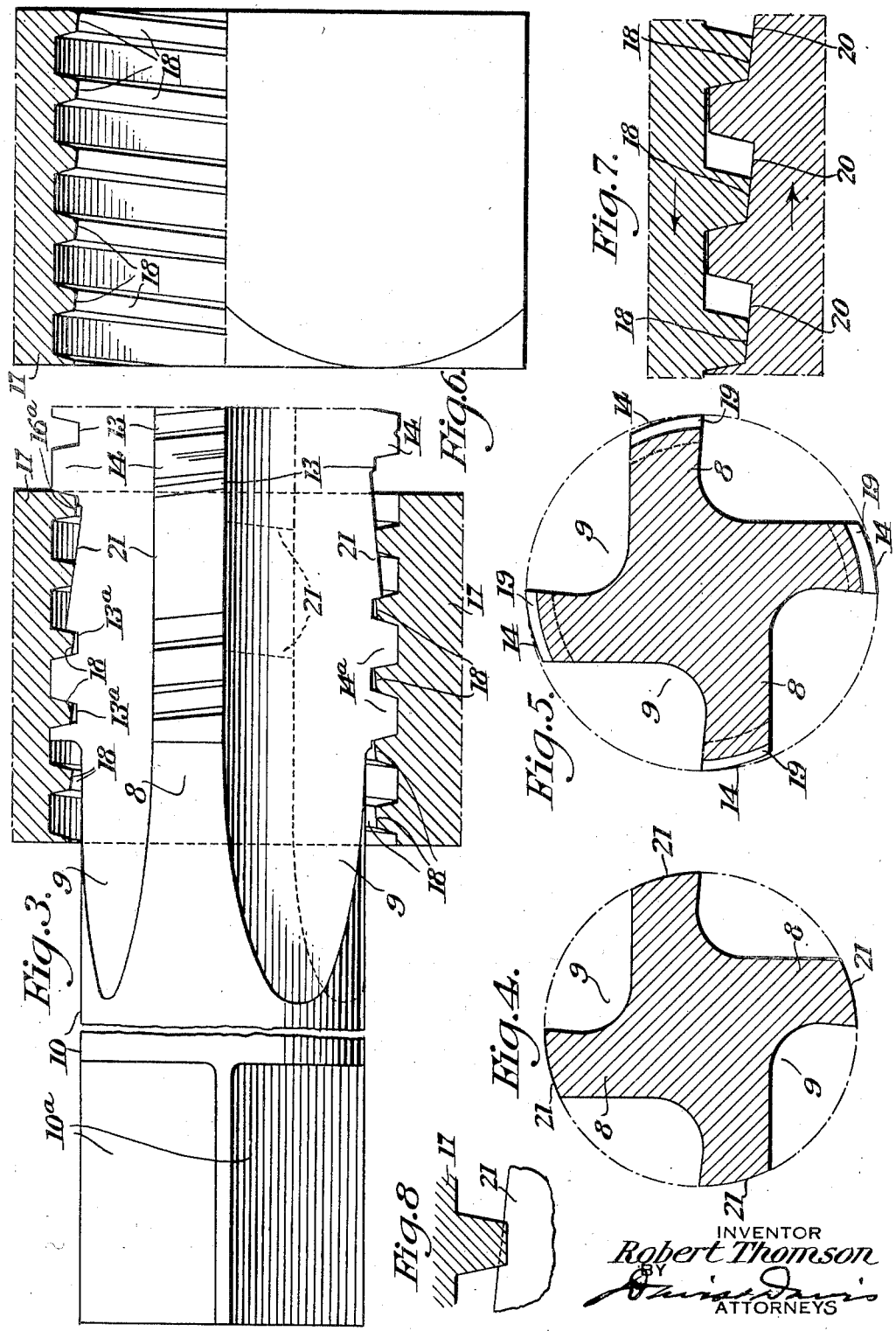

Patented Feb. 23, 1932

1,846,408

UNITED STATES PATENT OFFICE

ROBERT THOMSON, OF NEWARK, NEW JERSEY, ASSIGNOR TO DARDELET THREADLOCK CORPORATION, OF NEW YORK, N. Y., A CORPORATION OF DELAWARE

THREAD CUTTING TOOL

Application filed May 20, 1929. Serial No. 364,565.

This invention relates to improvements in thread cutting tools and is particularly adapted for embodiment in screw thread forming taps, although capable of useful embodiments in other types of thread cutting tools, such as chasers, and especially chasers and cutters for use in forming internal screw threads.

One important object of the invention is to provide a cutting tool, and particularly a tap, which will form a thread with great accuracy. Another important object of the invention is to provide an efficient tap for cutting the well-known Dardelet locking thread. A further important object of the invention is to provide a tap or other thread cutter with means for causing the metal removed by the cutting teeth to break off into small chips so as to avoid breaking of the tap or cutter and imposing abnormal loads or stresses thereon in operation. Another important object of the invention is to provide a tap, for use cutting internal Dardelet self-locking threads having the inclined binding or locking thread surface at the crest of the thread rib, which will produce threads wherein the crest or binding surface of the thread is smooth, highly exact as to its angle to the axial line of the thread from edge to edge, and highly exact as to size. A further object of the invention is to provide a tap, and especially a tap for cutting Dardelet threads, wherein the load on the tap in threading a hole will be advantageously distributed.

Other features and advantages of the invention will appear from the following description in detail of the preferred embodiment of the invention illustrated in the accompanying drawings, in which—

Fig. 1 is a fragmentary side view of a tap, showing a nut blank being acted on by the entering end of the tap;

Fig. 2 a similar view showing the nut blank being acted on by that portion of the threaded or toothed part of the tap adjacent the shank of the tap;

Fig. 3 is a similar view showing the nut feeding off on to the shank of the tap with most of the turns of its thread entirely finished;

Fig. 4 is a detail sectional view showing the rib crest finishing cutters of the tap;

Fig. 5 is a detail sectional view showing four successive thread groove cutting teeth on the non-tapered part of the tap, each tooth being broken away or in section through the lowest par of the chip breaking groove or channel therein;

Fig. 6 is a side view, partly in longitudinal section, of the finished Dardelet nut;

Fig. 7 is a fragmentary longitudinal sectional view on an enlarged scale showing a portion of the thread of a Dardelet nut in locking engagement with a corresponding portion of the thread of a Dardelet bolt; and Fig. 8 is a detail view on an enlarged scale showing the cutting action of the leading crest finishing or binding surface forming cutter on the tap.

The tap, in the preferred embodiment shown, has a cylindrical shank 10, preferably long enough to receive several finished nuts, a cylindrical or non-tapered threaded or toothed portion 11 (Fig. 1), and a tapered threaded or toothed portion 12 (Fig. 2), the outer end of the shank 10 having the usual attachment portion 10ª of the polygonal cross section shown, or any other desired form. The tap is also preferably provided (as shown) with four flutes 9 extending from the entering end of the tap to points in the shank 10, leaving four lands 8.

The thread groove 13 of the tap extends in a helical path, crossing the lands in succession to afford cutting teeth 14 on the lands, said teeth progressing around the land in the usual helical series and constituting the usual interrupted thread rib of the tap. The flutes 9 are preferably of such contour, as shown, as to give teeth 14 a slight front rake, as is common.

The top surfaces of the lands for a short distance back from the entering end of the tap are preferably ground off on a large taper (about 45 degrees) to form a narrow interrupted connoidal surface 15 at the entering end which will facilitate entrance of the tap into the original or preformed cylindrical bore 16 of the nut blank 17 and centering of the tap and blank with respect to each other.

The features of construction heretofore described are all well known.

In the improved tap shown in the drawings, the bottom of the thread groove 13 of the tap is parallel with the axial line of the tap and equidistant from said axial line from end to end of the groove and the root diameter of the tap thread is made materially less than the diameter of the unthreaded bore of the nut blank or other member the tap is designed to thread. In other words, the root diameter of the tap thread is substantially less than the crest diameter of the nut thread to be cut by the tap and the preformed cylindrical bore diameter of the nut blank to be threaded by the tap, leaving a substantial clearance (as shown in Figs. 1 and 2) between the helicoidal surface portion 16ª of the preformed cylindrical blank bore 16, which is to be later finished (as hereinafter explained) to form the inclined locking surface portion 18 of the nut thread, and the bottom of the thread groove 13 of the tap.

This arrangement has several advantages. Since there is no cutting action by the tap on the helicoidal surface portion of the nut blank at the top of the nut thread rib being developed by the action of the tap from the entering end of the tap to the opposite end of groove 13, the active cutting edge lengths of the teeth 14 are reduced at the smaller entering end of the tap; there is no friction or wear between the bottom surface of groove 13 and surface portion 16ª to increase the load on the tap and increase the diameter of portion 16ª of the blank; grinding away and malforming of the nut thread crest by grit or small chips which tend to work in between the bottom of the thread groove and the thread crest metal of the nut in taps which trim the crest metal at the entering end of the tap are avoided since such grit and chips will pass through the clearance space, falling out, or being flushed out of the groove into the flutes by the action of the lubricant stream; and further, the surface 16ª is left its original under size for reduction to accurate size and contour at the last, or substantially the last, part of the threaded portion of the tap so as to eliminate liability of deformation or marring of the thread crest profile before the finished nut passes on to the tap shank.

In order to break up the metal into small chips as it is removed by teeth 14 in the cutting out of the nut thread groove, and to further advantageously distribute the load and strains on the tap, a helical chip-breaking groove 19 (preferably parallel with the pitch line of the tap thread) is formed in the tap. Groove 19 is formed in the tops of teeth 14 and is preferably centered, as shown, relatively to the tooth bases. For the purposes above mentioned, the groove is preferably V-shaped with its sides at a uniform angle, but is deepest at the entering end of the tap and gets progressively more shallow until it fades or vanishes completely. The vanishing point is preferably on the non-tapered portion of the tap, one or two teeth short of the end of the helical series of teeth 14, as shown.

The apex or lowest point of groove 19 where it repeatedly passes through a single land 8 touches a straight line inclined to the axial line of the tap, and the location and inclination of this line is preferably such that it crosses the projection of the cylindrical bore 16 adjacent the junction of the non-tapered and tapered threaded portions of the tap. The groove at the entering end of the tap is preferably wide with relation to the width of the tops of the teeth 14, leaving two cutting portions at each side of the middle of the leading teeth, each of which cutting portions has a width about one-quarter of that of the tops of said leading teeth.

It will be observed that the described chip-breaking provision will cause the teeth 14 to gradually develop a medial V-shaped rib along what is to be the bottom of the nut thread groove, starting with a greatly truncated V-rib, and then gradually trimming away this rib to a smaller and smaller V-profile until the rib vanishes and the bottom surface of the nut thread rib becomes parallel with the axial line of the tap. The teeth 14 throughout, or substantially throughout, the tapered portion of the tap, thus partly develop the thread groove to full or substantially full depth by each tooth removing two narrow parallel cuts causing the removed metal to break into small chips and effectively eliminating rolling or balling of the cut metal in the flutes with the resultant choking and tap-breaking effects, while the remaining teeth 14 complete the development of the thread groove by gradual removal of the medial rib left by the preceding teeth. The work is thus advantageously distributed.

From the foregoing description it will be observed that, when the top of the nut blank reaches the last tooth 14, the crest of the nut thread rib has not been touched or cut by the tap. In the Dardelet self-locking nut, as commonly manufactured, the crest surface of the nut rib is inclined to the axial line of the nut at an angle of six degrees to form the self-holding binding surface portion 18 of the nut thread which wedges upon a similarly inclined bottom surface portion 20 of the bolt thread groove when the nut is screwed up against the work, as more fully explained in the United States patent to Dardelet, No. 1,657,244. It is important that the crest size of the Dardelet nut rib actually cut by a tap shall conform accurately with the standard which the tap is designed to cut, that the angle of the crest surface shall be accurate, and that the crest surface shall be smooth.

To insure attainment of these last-mentioned ends the crest metal is left untouched as above stated to the point in the relative travel of the tap and blank last above described, and the crest of the thread rib is then finished by the action of the crest trimming and angling teeth 21 of the tap. There are preferably one of these teeth 21 on each of the lands of the tap for better balancing of the forces exerted by the tap and insuring accuracy of crest trimming. The series of teeth 21 extend around the tap in a helical path parallel with that of the series of groove cutting teeth 14 and are preferably wider than teeth 14, and this helical series of wide teeth preferably extends through only one turn of the tap, as shown.

In the particular construction shown, teeth 21 are formed by grinding down each land on a six degree taper with an angled grinding wheel of sufficient thickness to span two adjacent teeth originally formed on the land as continuations of the helical series of teeth 14. The grinding is continued until the medial active portions of teeth 21 extend across a theoretical prolongation of groove 13 at the six degree angle entirely outward beyond a prolongation of the bottom line of groove 13 and preferably, as shown, sufficiently far beyond the bottom line of groove 13 to insure taking a cut of full width from the crest of the unfinished nut thread rib. In other words it is preferred that the active cutting portions of the edges of teeth 21 shall lie throughout somewhat beyond a prolongation of the original nut blank bore 16.

The teeth 14 are preferably given a slight top relief, as shown in Fig. 5, but teeth 21 preferably are not given top relief, as shown in Fig. 4. By not giving teeth 21 top relief they may be re-sharpened repeatedly without causing any reduction in the crest size of the finished thread which might impair or destroy the efficiency of the self-locking function of the nut when screwed on a Dardelet bolt. Preferably, also, all of the teeth 21 are precisely the same, so that the leading one will theoretically entirely finish the angle cutting of the thread crest, the remaining ones theoretically merely smoothing or burnishing the crest surface, and in practice functioning, upon dulling of the leading one, to insure cutting the crest down to the proper size and angle.

By providing the wide teeth 21, their tops may be more readily and more accurately ground to the proper taper and the teeth ground to accurate radial size, and the crest profiling surface accurately formed to properly profile the crest entirely across the nut thread rib. It is extremely difficult to accurately form the bottom of a thread groove corresponding in width with the nut thread rib thickness to either accurate size or taper, and to grind or otherwise form the bottom of such a narrow groove so as to give it the proper profile line, especially near the side walls of the tap thread groove.

In order that the nut blank may be firmly and accurately supported during finishing of the crest of the nut rib, the tap thread is continued one or more turns beyond the crest trimming teeth 21, the lands 8 being provided with a thread groove 13ª (which is in effect a continuation of the main thread groove 13), thereby forming an interrupted nut-supporting and feed off thread between the shank and the crest-trimming teeth. This feed off thread has an interrupted rib comprising a helical series of teeth 14ª of the same size and profile as the last or non-grooved tooth or teeth of the series of cutting teeth 14. Groove 13ª is the same size and preferably the same bottom diameter as groove 13 with its bottom parallel with the axis of the tap, so that the finished crest of the nut thread rib will not be touched by the tap as the nut is fed off on to the shank of the tap. The nut is firmly supported by the sides and top of the rib of the feed off thread, and is always supported by either the feed off thread or the last part of the groove cutting thread, or by both threads, during trimming of the crest of the nut thread to form the inclined locking surface 18.

It will be observed that the tap shown is well adapted for accurately threading a Dardelet nut, one of which is shown in Fig. 6 with the top of the nut at the left, so that when the nut is screwed on to a bolt against the work the binding surface 18 of the nut thread will ride up on and jam tightly on the inclined binding surface 20 of the bolt thread, as shown in Fig. 7, and more fully disclosed in the patent to Dardelet heretofore mentioned. The arrows in Fig. 7 represent the directions of reaction of the work on nut and bolt.

In the drawings the tops of the crest-trimming cutters are inclined inward toward the entering end of the tap, the tap being designed for entering the nut blank at the top of the nut. It will be obvious that if it be desired to enter the tap from the bottom of the nut, the crest trimmers should be given a taper in the opposite direction from that shown.

It will be obvious that changes may be made in the particular construction of tap shown, within the scope of the invention, and that parts of the improvements may be used without the others. It also will be obvious that the improvements or parts thereof may be embodied in other forms of thread-cutting tools, such as chasers, cutters for die chasers, built-up taps, collapsible and adjustable taps, etc.

What I claim is:

1. A rotary screw thread cutting device having a leading helical series of thread groove cutting elements each having side cutting edges and a cutting edge uniting said side cutting edges, the last-mentioned cutting edge of at least one of said elements farthest from the leading end of said series being parallel with the axis of the device and displaced radially of said axis to cut the full depth of the finished thread groove and the corresponding cutting edge of at least the leading one of said series of elements being displaced radially of said axis to cut less than full depth of the finished thread groove, and a following helical series of thread profile finishing cutting elements each offset axially of the device relatively to the helical path of the leading series of cutting elements, said finishing cutting elements having cutting edges slightly inclined to the axis of the device toward one and the same end thereof and each so located radially and axially of the device as to take but a single cut from the crest of a thread rib developed by the leading series of elements and to extend beyond both flanks of the rib during its cutting action.

2. A tap for cutting an internal self-locking screw thread, comprising three portions arranged end to end, the leading portion being profiled to cut an unfinished thread with cylindrical crest and root surfaces and a groove wider than its rib, the final portion being profiled to provide a non-cutting guide thread, and the intermediate portion being profiled to provide one or more thread finishing cutters having but a single cutting edge, which edge is slightly inclined to the tap axis toward one end of the tap and disposed on the tap to convert one cylindrical surface of the thread cut by the leading portion into a conoidal locking or wedging surface.

3. A tap as claimed in claim 2, wherein the intermediate thread finishing portion of the tap has a helical series of cutters with top cutting edges only, said cutting edges all being inclined to the tap axis toward the same end of the tap and so arranged as to trim the crest of the rib of the unfinished thread to final form within one revolution of the tap and overhang both flanks of the rib during the trimming action thereof.

4. The method of cutting internal Dardelet locking screw threads which comprises cutting the thread groove progressively from one end of the thread to full width and depth with a rib narrower than the groove, and cutting away the crest of the rib progressively from the same end of the thread during the cutting of the groove and only where the groove has been previously cut to full size and depth until a slightly conoidal locking surface is generated on the rib crest.

5. The method of cutting internal locking screw threads in cylindrical bores which comprises progressively developing the thread from one end at a single operation by removing material solely to form a thread groove wider than the rib left by such removal and removing material solely from the crest of the rib so left to form a slightly conoidal locking surface as the progressive development of the thread continues.

6. The method of cutting locking screw threads which comprises progressively developing the thread from one end with a groove wider than its rib by removing material solely to form the said thread groove, and removing material solely to form a slightly conoidal locking surface on the top of the thread rib developed by the formation of the groove in successive cutting stages in the order set forth during a single thread cutting operation.

7. The method of cutting an internal Dardelet locking screw thread in a cylindrical bore completely during one thread forming operation which comprises cutting away material from the wall of the bore to form progressively from one end a helical thread groove wider than the helical thread rib developed by such cutting and without removing material from said wall between the turns of the groove, and progressively trimming the top of the thread rib to slightly conoidal form as its development by the groove cutting action is completed by cutting material from said bore wall between the turns of the groove by a cutting element whose rib trimming edge takes but a single cut from the rib and extends at a slight angle to the bore axis during the cutting and beyond both flanks of the rib at the cutting point.

8. A tap having a fluted cutting body for cutting an internal screw thread with a conoidal crest surface, characterized in that said tap body has on its lands two coaxial threads of equal pitch with non-tapered roots and identical maximum profile lying in a common helix, and also has, upon at least one land and intermediate the adjacent ends of said threads, a cutting edge that is inclined to the tap axis and extends entirely across the common helical path of the thread grooves of said threads with said edge displaced farther from the tap axis than the roots of said threads from edge to edge of said thread groove path, the leading thread progressively increasing in height for a portion of the length of said thread, and the following thread having a constant profile.

9. A tap as claimed in claim 8, characterized in that the following thread and the full height portion of the leading thread have crest surfaces parallel with the tap axis, and that the base thickness of the leading thread and the angular relations of the sides of said thread to the tap axis are all constant from end to end of that thread.

10. A tap as claimed in claim 8, wherein said inclined cutting edge extends beyond both sides of said common helical path of the thread grooves of the tap threads but only once intersects said path with a portion of said edge which is farther from the tap axis than the thread roots.

11. A tap having a fluted cutting body for cutting an internal screw thread with a conoidal crest surface, said body having upon its lands two coaxial threads of equal pitch lying in a common helix and each interrupted between its ends only by the tap body flutes, and also having its lands provided between the two threads with a helical series of thread-finishing cutting portions interrupted only by the flutes with top cutting edges all inclined to the tap axis toward the same end of the tap, each land having thereon at least one portion of the leading thread and also having one and only one of said cutting portions, the body being threaded only with said two threads, the leading thread having a non-tapered root and also having its height increased from land to land from its leading end to a maximum height, each of said inclined top cutting edges of said thread-finishing cutting portions extending across and beyond both sides of the common helical path of the thread grooves of the tap threads and intersecting said path but once with a portion of the inclined edge displaced farther from the tap axis than the non-tapered root of the leading thread, and the following tap thread having a constant profile correlated with the leading thread and series of thread-finishing cutting portions to accommodate a thread generated by said leading thread and cutting portions.

In testimony whereof I hereunto affix my signature.

ROBERT THOMSON.